United States Patent
Yu et al.

(10) Patent No.: US 10,069,401 B2
(45) Date of Patent: Sep. 4, 2018

(54) PROTECTION CIRCUIT

(71) Applicant: INDUSTRIAL TECHNOLOGY RESEARCH INSTITUTE, Hsinchu (TW)

(72) Inventors: Ming-Hung Yu, Miaoli (TW); Po-Li Chen, Berlin Township, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 510 days.

(21) Appl. No.: 14/962,494

(22) Filed: Dec. 8, 2015

(65) Prior Publication Data

US 2017/0104404 A1 Apr. 13, 2017

(30) Foreign Application Priority Data

Oct. 7, 2015 (TW) .............................. 104133010 A (51) Int. Cl.
*H02H 3/02* (2006.01)
*H02H 9/04* (2006.01)
(Continued)

(52) U.S. Cl.
CPC ................ *H02M 1/32* (2013.01); *H02H 7/00* (2013.01); *H02M 7/5387* (2013.01)

(58) Field of Classification Search
CPC .................................... H02H 3/20; H02H 9/04
(Continued)

(56) References Cited

U.S. PATENT DOCUMENTS 7,667,941 B2 * 2/2010 Kawashima ............ H02M 1/32
361/79
8,976,551 B2 3/2015 Igarashi et al.
(Continued)

FOREIGN PATENT DOCUMENTS

JP 4761117 B2 12/2006
TW 201448428 A 9/2014
TW I452808 B 9/2014

OTHER PUBLICATIONS

Jon Andreu, Jose Miguel De Diego, Inigo Martinez De Alegria, "Matrix Converter: Improvement on the Start-Up and the Switching Behavior", Department of Electronics and Telecommunications, University of the Basque Country, Spain, I.E.E.E. 2008, p. 1-6.
(Continued)

*Primary Examiner* — Dharti Patel
(74) *Attorney, Agent, or Firm* — Muncy, Geissler, Olds & Lowe, P.C.

(57) ABSTRACT

A protection circuit applied to a convertor including M pieces of driving switch modules each coupled to a power source, a load and one of M sets of driving signals. The ith driving switch module is controlled by the ith set of driving signals to selectively enable current paths between the power source and the load. A first sub protection circuit in the protection circuit includes a first protection switch module and a first detection module coupled to the first protection switch module. When the ith set of driving signals indicates an error event, the first protection switch module selectively couples the ith set of driving signals to a reference voltage according to a first detection signal. M and i are positive integers, and i is not larger than M.

17 Claims, 10 Drawing Sheets

(51) Int. Cl.
*H02M 1/32* (2007.01)
*H02H 7/00* (2006.01)
*H02M 7/5387* (2007.01)

(58) Field of Classification Search
USPC ........................................................ 361/93.2
See application file for complete search history.

(56) References Cited

U.S. PATENT DOCUMENTS

| | | | |
|---|---|---|---|
| 2008/0088998 A1* | 4/2008 | So | H02H 3/006 361/93.9 |
| 2013/0002186 A1 | 1/2013 | Iwahori | |
| 2014/0022684 A1* | 1/2014 | Jiang | H02H 3/08 361/93.1 |
| 2014/0126256 A1 | 5/2014 | Fernando et al. | |
| 2015/0130432 A1 | 5/2015 | Yamazaki et al. | |

OTHER PUBLICATIONS

Dipl.-Ing. M. Pfeifer, Prof. Dr.-Ing. G. Schroder, "Protection Circuit for the Matrix Converter", University of Siegen, Institute for Power Electronics and Electrical Drives, De, I.E.E.E. 2008, p. 1-4.

* cited by examiner

PROTECTION CIRCUIT

CROSS-REFERENCE TO RELATED APPLICATIONS

This non-provisional application claims priority under 35 U.S.C. § 119(a) on Patent Application No(s). 104133010 filed in Taiwan, R.O.C. on Oct. 7, 2015, the entire contents of which are hereby incorporated by reference.

TECHNICAL FIELD

The disclosure relates to a protection circuit.

BACKGROUND

Recently matrix conversion devices have been progressively attracting public attention. The so-called matrix conversion device is a power conversion device capable of directly converting three-phase AC power into another AC power having any voltage and frequency without converting AC power into DC power. Therefore, a matrix convertor has a smaller size, less components, and lower manufacture costs. Because of these properties, matrix convertors progressively become prevalent in the fields requiring rigid usage conditions, such as energy conservation or low noise.

Generally, a matrix conversion device requires accurate time sequence control in order to switch on or off every switch at the right time. When an error occurs on the time sequence of any driving signal or when noises cause the offset of the potential of any driving signal, it will influence the performance of the matrix convertor and even cause short-circuits damaging circuits.

SUMMARY

According to one or more embodiments, the disclosure provides a protection circuit applied to a convertor including M pieces of driving switch modules coupled to a power source, a load, and M sets of driving signals. The ith driving switch module is controlled by the ith set of driving signals to selectively enable an ith set of current paths between the power source and the load. The protection circuit includes a first sub protection circuit and a first detection module. The first protection switch module selectively couples the ith set of driving signals to a reference voltage according to a first detection signal. The first detection module is coupled to the first protection switch module. When the ith set of driving signals indicate an error event, the first detection module generates the first detection signal according to the ith set of driving signals. M and i are positive integers, and i is not larger than M.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
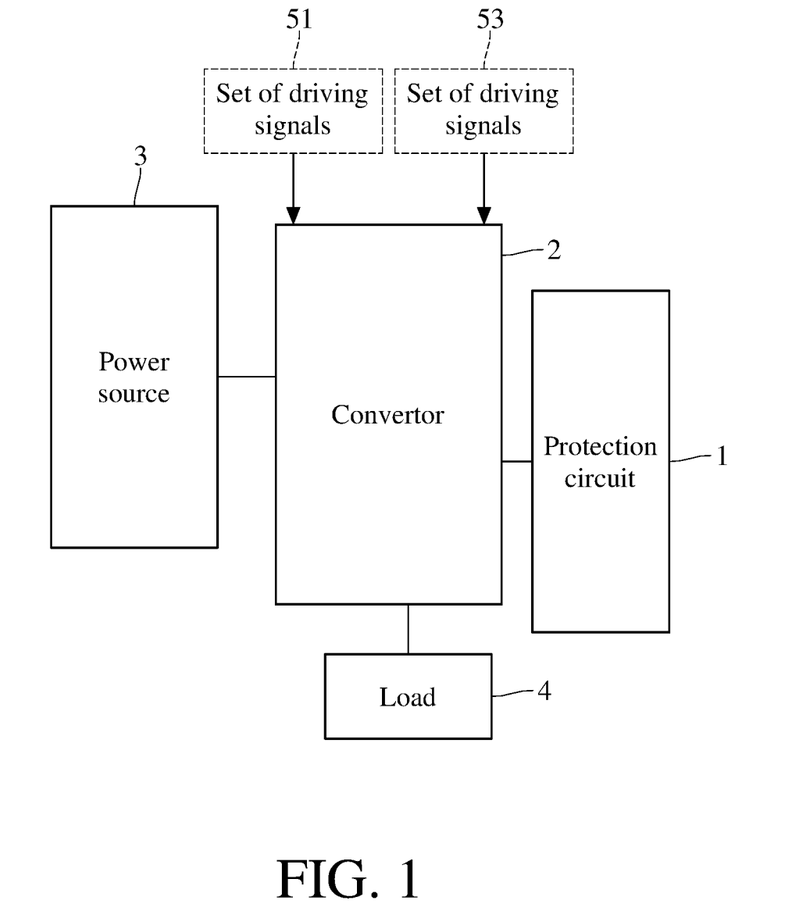
FIG. 1 is a functional block diagram of a protection circuit with respect to a convertor in an embodiment.
Figure 2:
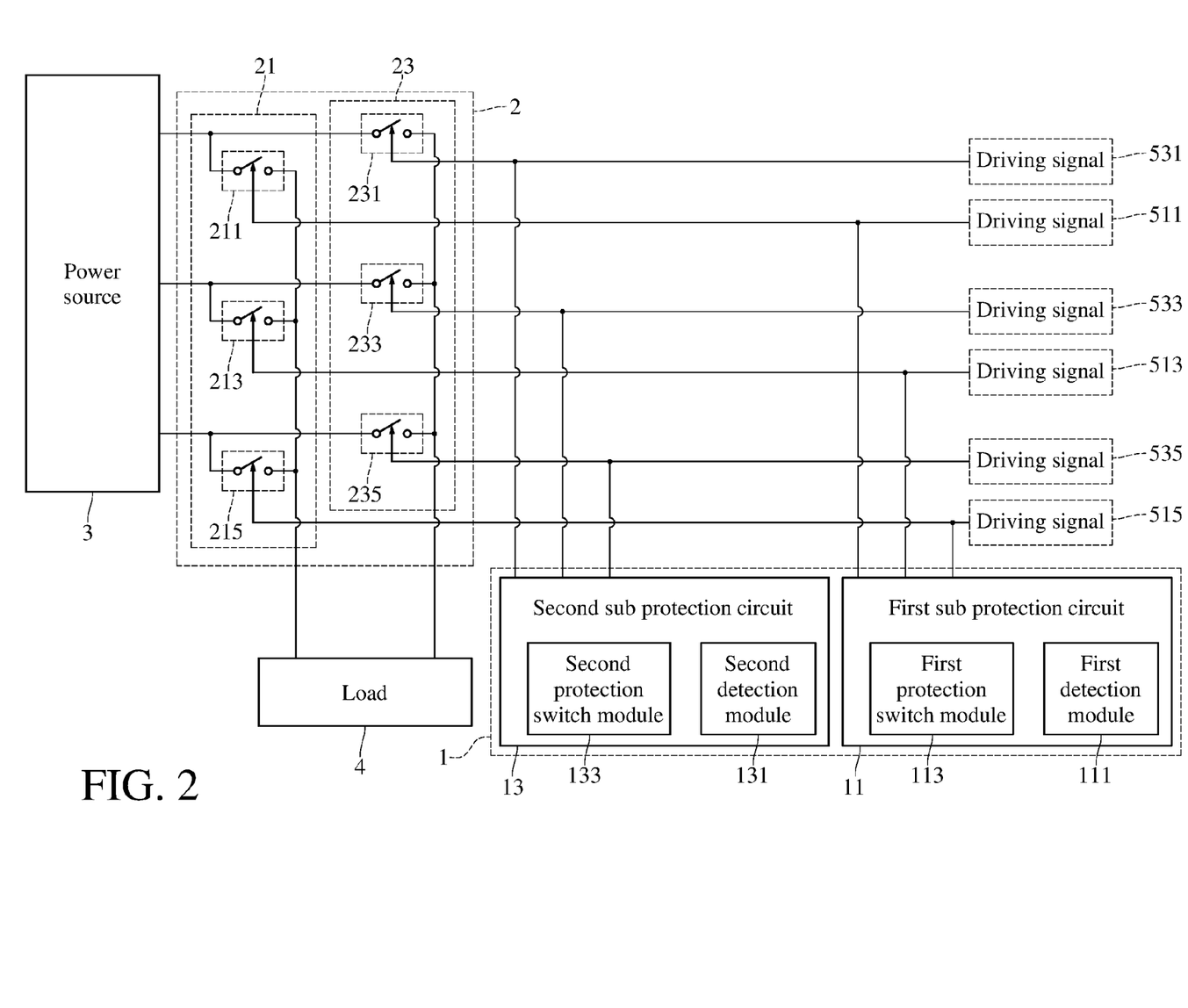
FIG. 2 is a functional block diagram of the structure of a protection circuit.

Please refer to FIG. 1 and FIG. 2. FIG. 1 is a functional block diagram of a protection circuit with respect to a convertor in an embodiment, and FIG. 2 is a functional block diagram of the structure of a protection circuit. A protection circuit 1 is applied to a convertor 2. The convertor 2 includes driving switch modules 21 and 23. The driving switch modules 21 and 23 are coupled to a power source 3 and a load 4, and the driving switch modules 21 and 23 are coupled to a set of driving signals 51 and a set of driving signals 53, respectively. Specifically, the driving switch modules 21 and 23 include driving switches 211 to 215 and driving switches 231 to 235, respectively. The set of driving signals 51 includes driving signals 511 to 515, and the set of driving signals 53 includes driving signals 531 to 535. The driving switch modules 21 and 23 are controlled by the sets of driving signals 51 and 53 respectively to selectively enable multiple sets of current paths between the power source 3 and the load 4. In an example with respect to the driving switch module 21, the driving switch 211 is controlled by the driving signal 511 in the set of driving signals 51 to selectively enable one current path of one of multiple sets of current paths between the power source 3 and the load 4, and the driving switch 213 is controlled by the driving signal 513 in the set of driving signals 51 to selectively enable one current path of one of the sets of current paths between the power source 3 and the load 4. A person skilled in the art can deduce the relationship between other driving switches and driving signals, and the disclosure will have no limitation in it.

The convertor 2 is, for example, not limited to a matrix convertor. All convertors having multi-phase and multi-arm and being capable of converting energy of a power source into energy of another power source can be applied to the protection circuit in the disclosure. Likewise, the load 4 is, for example, not limited to a DC load or an AC load. The power source 3 is, for example, not limited to a DC power source or an AC power source. The following embodiments are described based on that a matrix convertor used as the convertor 2, an AC three-phase power source used as the power source 3, a DC load used as the load 4. Likewise, although the following embodiments are described based on the set of driving signals 51 and 53, the disclosure has no limitation on the number of sets of driving signals and the number of driving signals in each set.

The protection circuit 1 includes a first sub protection circuit 11 and a second sub protection circuit 13. Similarly, the number of sub protection circuits will not be limited, and the first sub protection circuit 11 and the second sub protection circuit 13 are exemplarily described as follows. The first sub protection circuit 11 includes a first protection switch module 111 and a first detection module 113. The first detection module 113 is coupled to the first protection switch module 111. When the set of driving signals 51 indicate that an error event occurs, the first protection switch module 111 selectively couples the set of driving signals 51 to a reference voltage according to a first detection signal Si. In an embodiment, the first detection module 113 determines a value specified by the set of driving signals 51 and then selectively the output terminals of relevant circuits for the set of driving signals 51 to the reference voltage. The error event herein indicates, for example but not limited to, that any error occurs on the time sequences of the driving signals 511 to 515 in the set of driving signals 51 or to that any potential offset occurs on the driving signals 511 to 515, and the error event will be described in detail later.

Figure 3A:
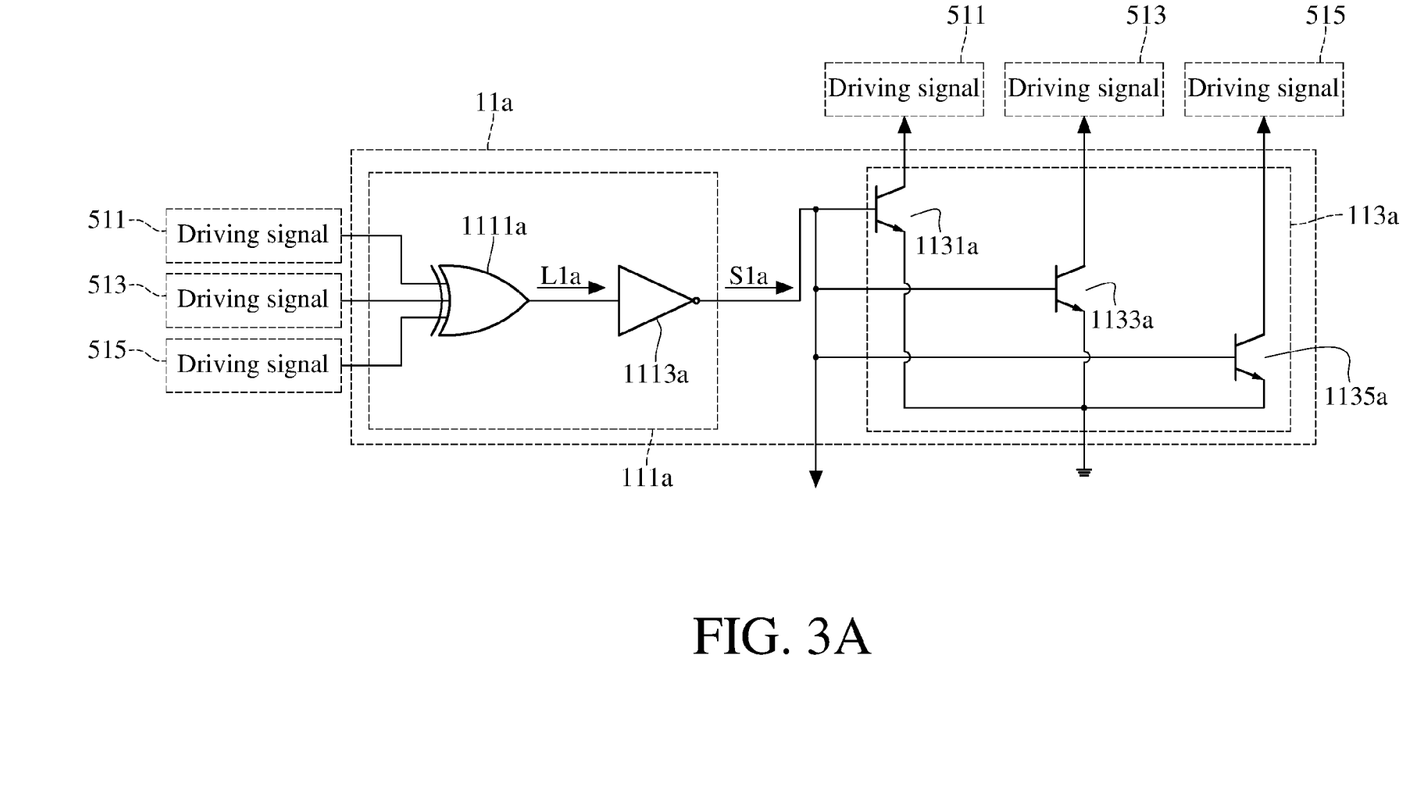
FIG. 3A is a schematic circuit diagram of a protection circuit in an embodiment.

Please refer to FIG. 3A to describe the protection circuit in detail. FIG. 3A is a schematic circuit diagram of a protection circuit in an embodiment. A first detection module 11a includes a NOR gate 1111a and a first logic gate 1113a. The NOR gate 1111a is coupled to the first logic gate 1113a. The first protection switch module 113a includes protection switches 1131a-1135a. The NOR gate 1111a generates a first logic signal L1a according to the driving signals 511 to 515, and the first logic gate 1113a generates a first detection signal S1a according to the first logic signal L1a. The control terminals of the protection switches 1131a to 1135a are coupled to the output terminal of the first logic gate 1113a so the protection switches 1131a to 1135a selectively couple the driving signals 511 to 515 to the reference voltage according to the first detection signal S1a. In this embodiment, the driving signals 511 to 515 are, for example, not limited to be selectively coupled to the ground end.

In this embodiment, the first logic gate 1113a is a NOT gate so the first detection signal S1a is opposite to the first logic signal L1a. For the NOR gate 1111a, when only one of the driving signals 511 to 513 is at a high voltage, the first logic signal L1a is at a high voltage. Therefore, when all the driving signals 511 to 513 are simultaneously at low voltage potential, or when at least two of the driving signals 511 to 513 are simultaneously at a high voltage, the first logic signal L1a is at low voltage potential. Herein, since the first detection signal S1a is opposite to the first logic signal L1a, the first detection signal S1a is at high voltage potential, which leads to the turned on of the protection switches 1131a to 1135a, which couple the driving signals 511 to 513 to the ground end.

In another aspect, when all the driving signals 511 to 513 are simultaneously at low voltage potential, since the driving switches 211 to 215 are turned off, coupling the driving signals 511 to 513 to the ground end by the protection circuit 1 will not affect the original operation of the convertor 2. However, when at least two of the driving signals 511 to 513 are at high voltage potential, it means that at least two of the driving switches 211 to 215 will simultaneously be turned on. Herein, at least two of three phase output terminals of the power source 3 are short-circuited, resulting in the occurrence of errors or damages on circuits. Accordingly, when at least two of the driving signals 511 to 513 are at high voltage potential at the same time, the protection circuit 1 couples the driving signals 511 to 513 to the ground end in order to avoid the occurrence of the short circuit on the three phase output terminals of the power source 3 and the occurrence of any false action on the relevant circuits.

Note that, as described in FIG. 3A, when the first detection signal S1a is at high voltage potential, the protection switches 1131a to 1135a are turned on; when the driving signals 511 to 515 and 531 to 535 are at high voltage potential, the driving switches 211 to 215 and 231 to 235 are turned on in pairs. This operation will be described in detail later. Other embodiments may be contemplated in which the protection switches 1131a to 1135a and the driving switches 211 to 215 and 231 to 235 are turned on in response to the low voltage potential. Those skilled in the art can readily use the disclosed conception and specific embodiments as a basis for designing or modifying the related circuit structure for carrying out the same purposes of the present invention, and the related circuit structure will not be limited by the exemplary embodiments in the disclosure.

Figure 3B:
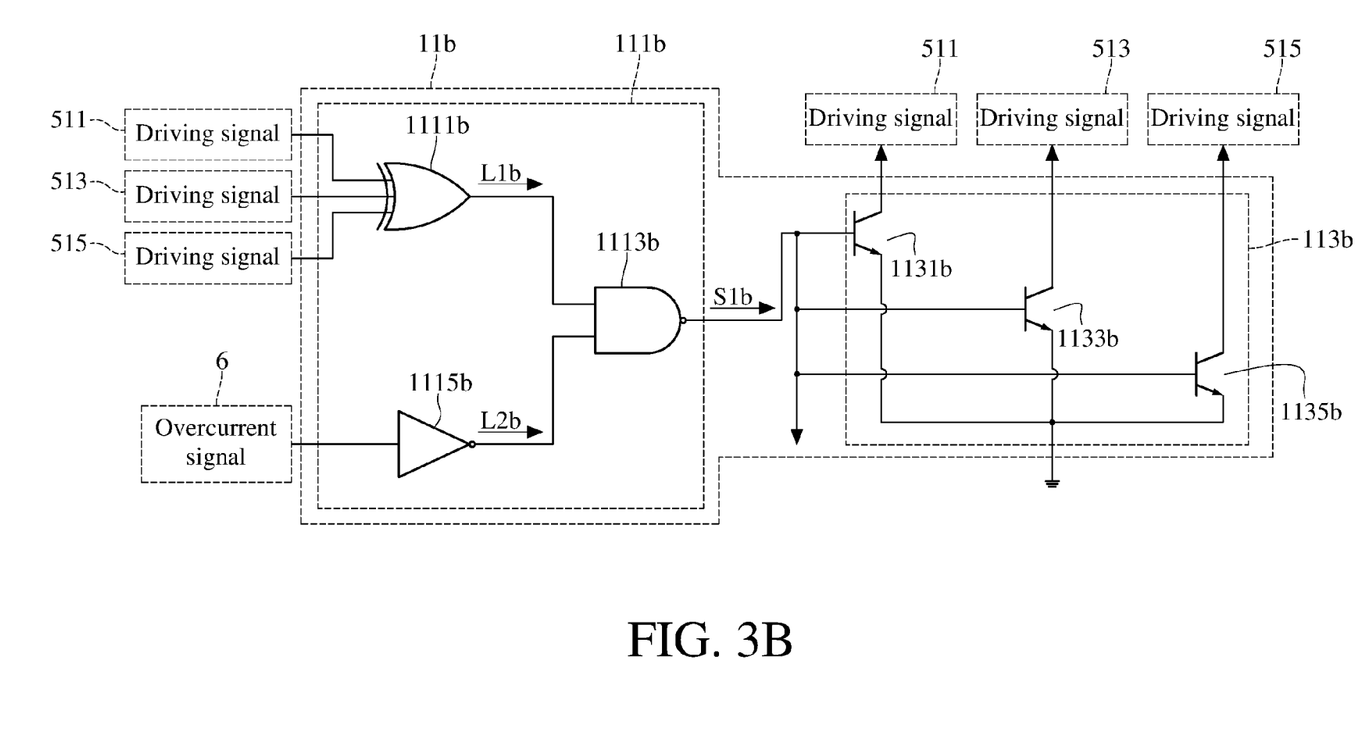
FIG. 3B is a schematic circuit diagram of a protection circuit in another embodiment.

Moreover, the protection circuit provided in the disclosure may further avoid the overcurrent on the load 4. Please refer to FIG. 3B. FIG. 3B is a schematic circuit diagram of a protection circuit in another embodiment. The first detection module 111b further selects one or more of the driving signals 511 to 515 to couple the selected one or more driving signals to the ground end according to an overcurrent detection signal 6 transmitted from the load 4. In details, the first detection module 111b further includes a second logic gate 1115b which is coupled to the first logic gate 1113b. The second logic gate 1115b generates a second logic signal L2 according to the overcurrent detection signal 6. In this embodiment, the first logic gate 1113b generates the first detection signal S1b according to the first logic signal L1b and the second logic signal L2b. For example, the first logic gate 1113b is a NAND gate, and the second logic gate 1115b is a NOT gate. Other embodiments may be contemplated in which the first logic gate 1113b and the second logic gate 1115b can be replaced by other circuits having the same input and output as the first logic gate 1113b and the second logic gate 1115b, respectively.

Figure 4A:
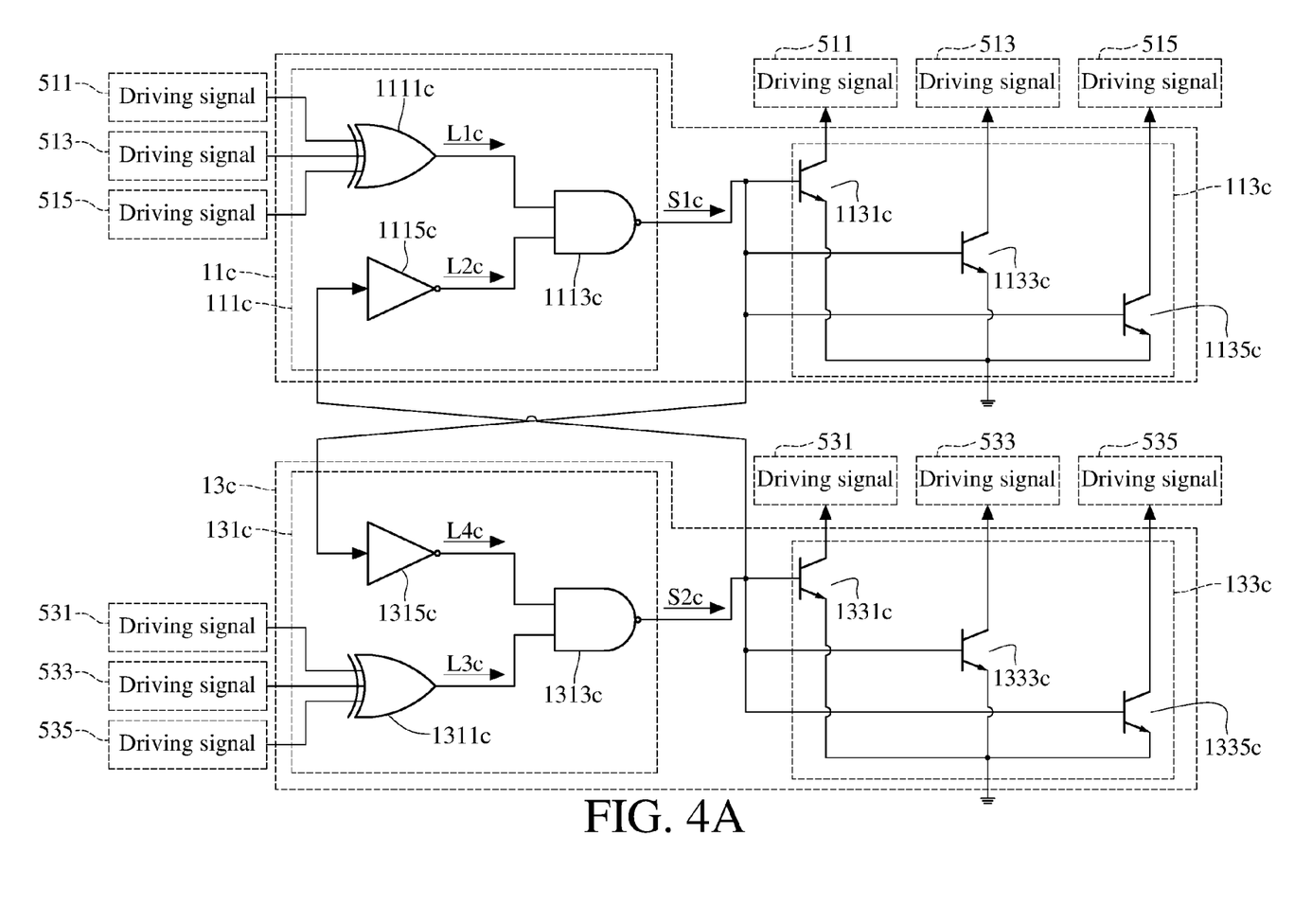
FIG. 4A is a schematic circuit diagram of a protection circuit in another embodiment.

The previous description relates to a single sub protection circuit. In practice, as shown in FIG. 2, the protection circuit in the disclosure can include multiple sub protection circuits, and the sub protection circuits are capable of interlocking each other for more rigorous protection control. Please refer to FIG. 4A. FIG. 4A is a schematic circuit diagram of a protection circuit in another embodiment. A protection circuit 1c includes a first sub protection circuit 11c and a second sub protection circuit 13c. The first sub protection circuit 11c is coupled to the second sub protection circuit 13c. The second sub protection circuit 13c includes a second detection module 131c and a second protection switch module 133c. The second detection module 131c includes an exclusive-OR (XOR) gate 1311c, a third logic gate 1313c, and a fourth logic gate 1315c. The second protection switch module 133c includes protection switches 1331c to 1335c. The first sub protection circuit 11c and the second sub protection circuit 13c have similar circuit structure and operation, and these similar parts will not be repeated hereinafter.

The output terminal of the first detection module 111c in the first sub protection circuit 11c is coupled to the second detection module 131c in the second sub protection circuit 13c, and the output terminal of the second detection module 131c in the second sub protection circuit 13c is coupled to the first detection module 111c in the first sub protection circuit 11c. The first detection module 111c further generates a first detection signal S1c according to a second detection signal S2c generated by the second detection module 131c, and the second detection module 131c further generates the second detection signal S2c according to the first detection signal S1c generated by the first detection module 111c.

For the operation of the first detection module 111c, the second logic gate 1115c in the first detection module 111c generates a second logic signal L2c according to the second detection signal S2c, and the first logic gate 1113c generates the first detection signal S1c according to the first logic signal L1c and the second logic signal L2c. In this embodiment, the first logic gate 1113c is a NAND gate, and the second logic gate 1115c is a NOT gate. In other words, when the second detection signal S2c is at high voltage potential, the first detection signal S1c becomes high voltage potential. Herein, the protection switches 1131c to 1135c in the first protection switch module 113c and the protection switches 1331c to 1335c in the second protection switch module 133c are turned on so that the driving signals 511 to 515 and 531 to 535 are coupled to the ground end. Similarly, when the first detection signal S1c is at high voltage potential, the protection switches 1131c to 1135c in the first protection switch module 113c and the protection switches 1331c to 1335c in the second protection switch module 133c are turned on. In view of another aspect, only if one of the sets of driving signals 51 and 53 indicates the occurrence of an error event are all the sets of driving signals 51 and 53 coupled to the ground end. Herein, none of the driving switches 211 to 215 and 231 to 235 is turned on in order to rigorously avoid false actions in circuits.

Figure 4B:
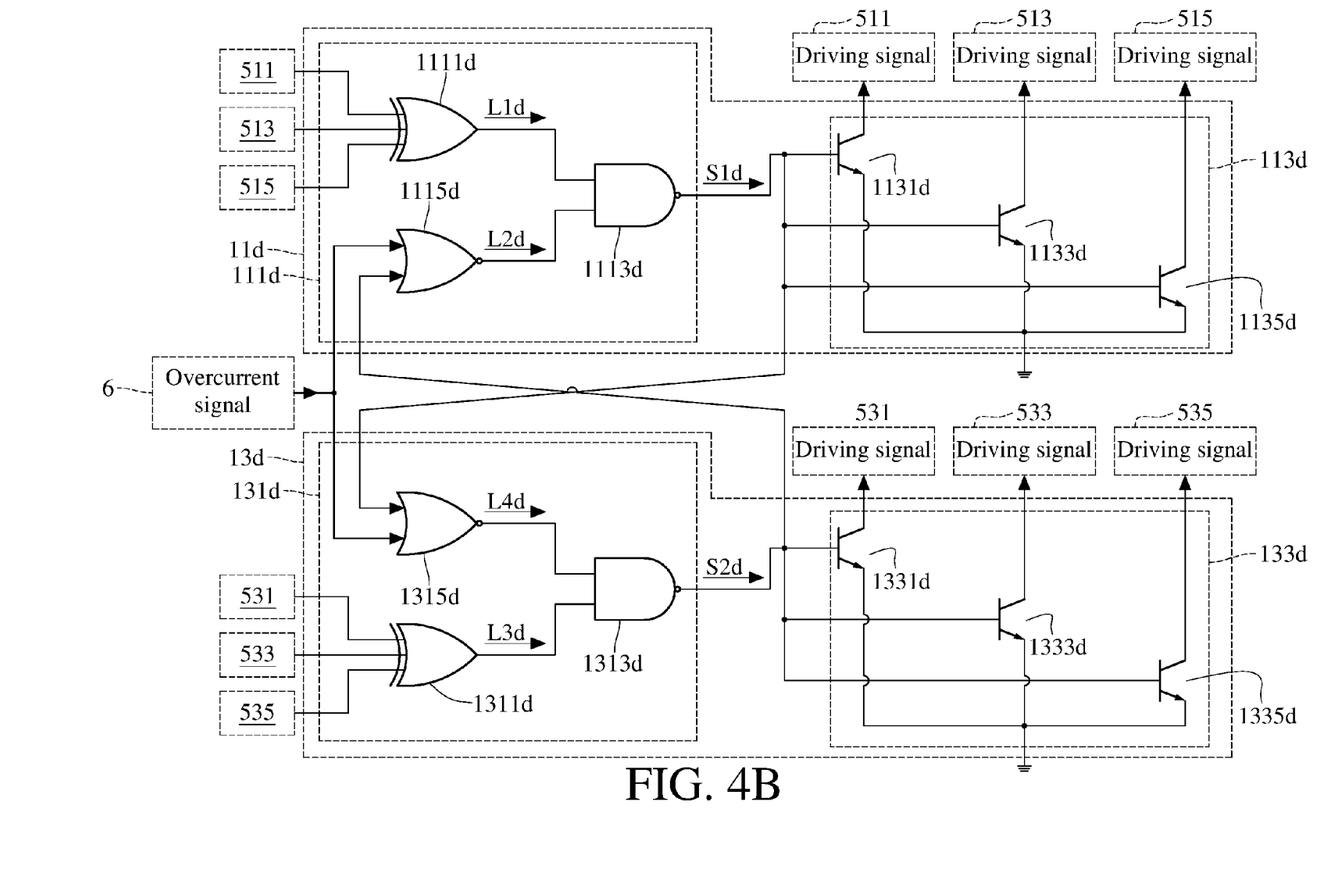
FIG. 4B is a schematic circuit diagram of a protection circuit in another embodiment.

Also, the first sub protection circuit may further selectively couple one or more driving signals to the ground end according to the operation of the second sub protection circuit and the overcurrent detection signal. Please refer to FIG. 4B. FIG. 4B is a schematic circuit diagram of a protection circuit in another embodiment. As described in the drawing, second logic gates 1115d and 1315d generate first logic signals L1d and L3d according to an overcurrent detection signal 6 transmitted from the load 4, respectively. In this embodiment, the first logic gates 1113d and 1313d are, for example, not limited to NAND gates, and the second logic gates 1115d and 1315d are, for example, not limited to NOR gates. For the first sub protection circuit 11d, when at least two of the driving signals 511 to 515 are at high voltage potential, or when either the overcurrent detection signal 6 or the second detection signal S2d is at high voltage potential, the first detection signal S1d will become high voltage potential. Herein, the second detection signal S2d also becomes high voltage potential, and the driving signals 511 to 515 in the set of driving signals 51 and the driving signals 531 to 535 in the set of driving signals 53 are coupled to the ground end through the turned-on protection switches 1131d to 1135d and 1331d to 1335d.

Figure 5A:
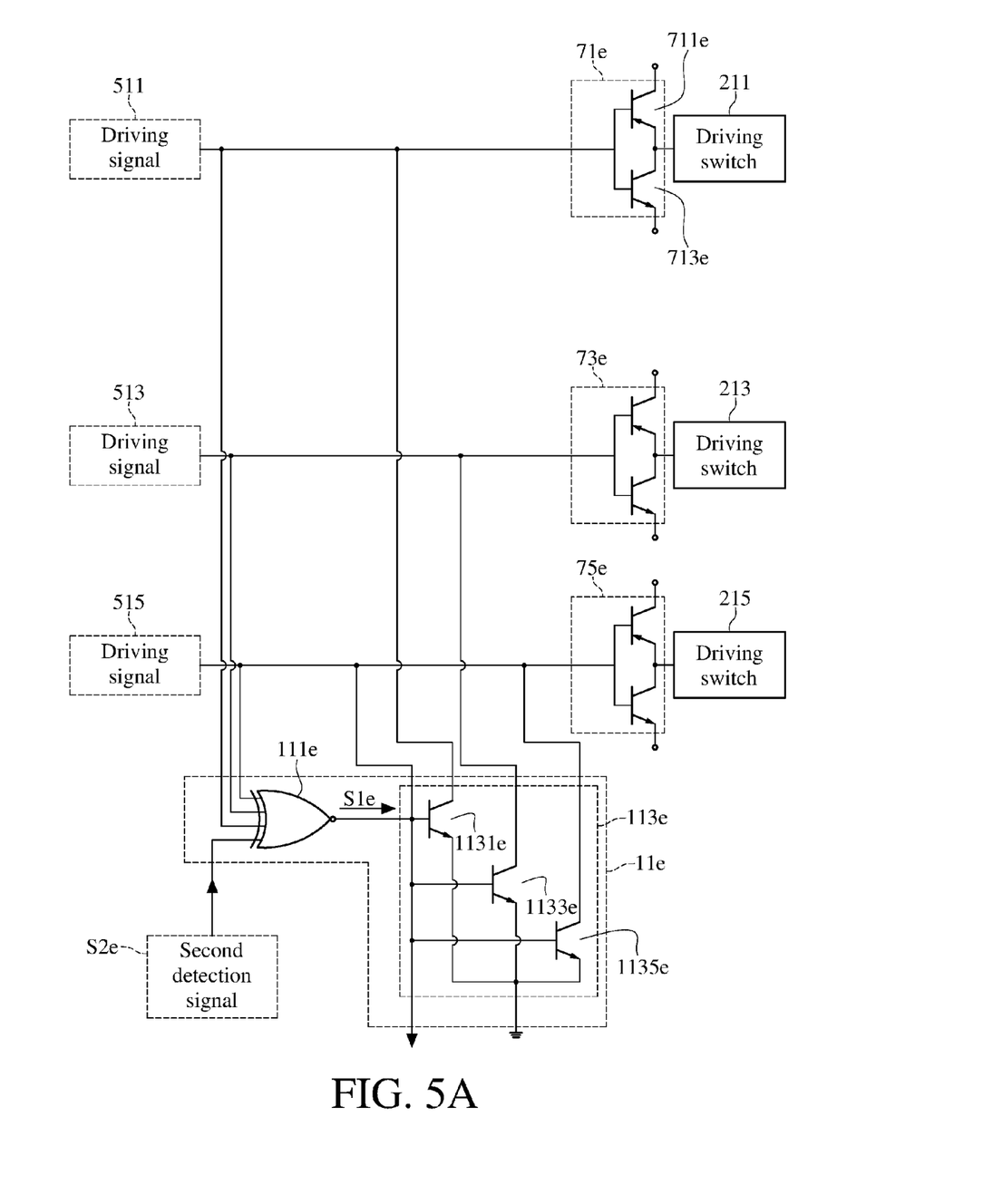
FIG. 5A is a schematic circuit diagram of a protection circuit in another embodiment.

In another embodiment, the first detection module is a single NOR gate, as shown in FIG. 5A. FIG. 5A is a schematic circuit diagram of a protection circuit in another embodiment. A first detection module 111e is an XNOR gate, and the first detection module 111e generates a first detection signal S1e according to the driving signals 511 to 515 and a second detection signal S2e. Similar to the previous one or more embodiments, when the driving signals 511 to 515 indicate that an error event occurs on the load 4, the first sub protection circuit 11e will also selectively couple the driving signals 511 to 515 to the ground end according to the driving signals 511 to 515. Furthermore, the first sub protection circuit 11e and other sub protection circuits can interlock each other so only if one of sets of driving signals indicates the occurrence of an error event will all driving signals be coupled to the ground end, so as to avoid false actions in circuits.

Moreover, the protection circuit 1e further includes multiple output stages 71e to 75e. The output stages 71e to 75e drive the driving switches 211 to 215 according to the driving signals 511 to 515, respectively in order to selectively turn on one or more current paths between the power source 3 and the load 4. In an exemplary description with respect to the output stage 71e, as described in FIG. 5A, the output stage 71e includes a first transistor 711e and a second transistor 713e. The first transistor 711e is a PNP bipolar junction transistor, and the second transistor 713e is a NPN bipolar junction transistor. The emitter of the first transistor 711e is coupled to the driving switch 211, the collector of the first transistor 711e is coupled to the high voltage potential, and the base of the first transistor 711e is coupled to the driving signal 511. The emitter of the second transistor 713e is coupled to the reference voltage, the collector of the second transistor 713e is coupled to the emitter of the first transistor 711e and the driving switch 211, and the base of the second transistor 713e is coupled to the driving signal 511 and the base of the first transistor 711e.

Figure 5B:
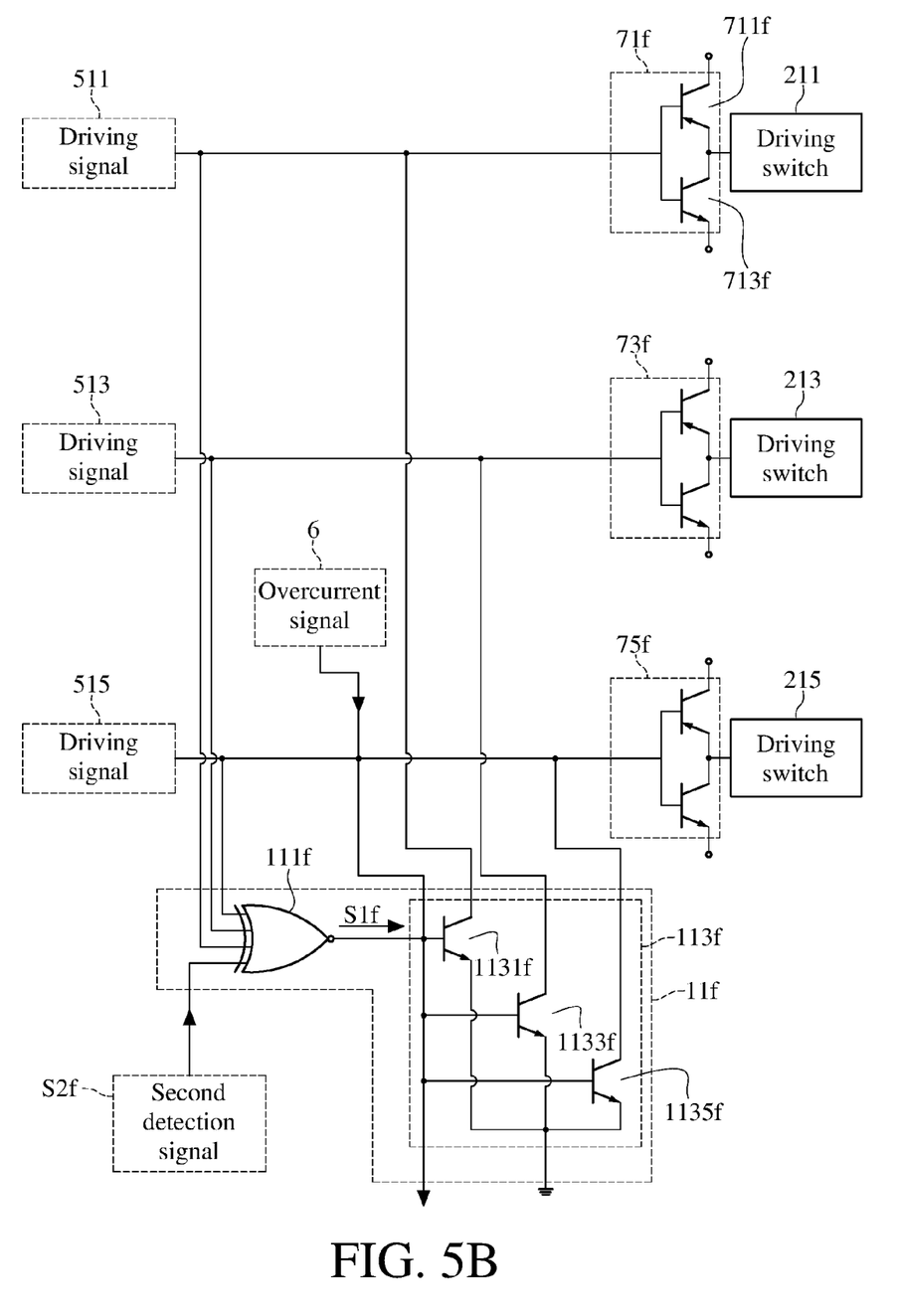
FIG. 5B is a schematic circuit diagram of a protection circuit in another embodiment.

Please refer to FIG. 5B. FIG. 5B is a schematic circuit diagram of a protection circuit in another embodiment. An exemplary embodiment with respect to the first sub protection circuit 11f is described as follows in which the first sub protection circuit 11f selectively couples the driving signals 511 to 515 to the ground end according to the overcurrent detection signal 6. Specifically, the overcurrent detection signal 6 is a control terminal applied to the protection switches 1131f to 1135f in the protection switch module 113f. When the overcurrent detection signal 6 indicates that an overcurrent event occurs, the protection switches 1131f to 1135f are turned on. In this embodiment, the overcurrent detection signal 6, indicating that an overcurrent event occurs, is at high voltage potential. Moreover, since the sub protection circuits can interlock each other, when the first sub protection circuit 11f couples the driving signals 511 to 515 to the ground end, other sub protection circuits also couple their respective driving signals to the ground end. The related detailed description can be referred to the aforementioned embodiments and thus, will not be repeated hereinafter.

Moreover, other embodiments with respect to the output stages of the protection circuit are described below.

Figure 6A:
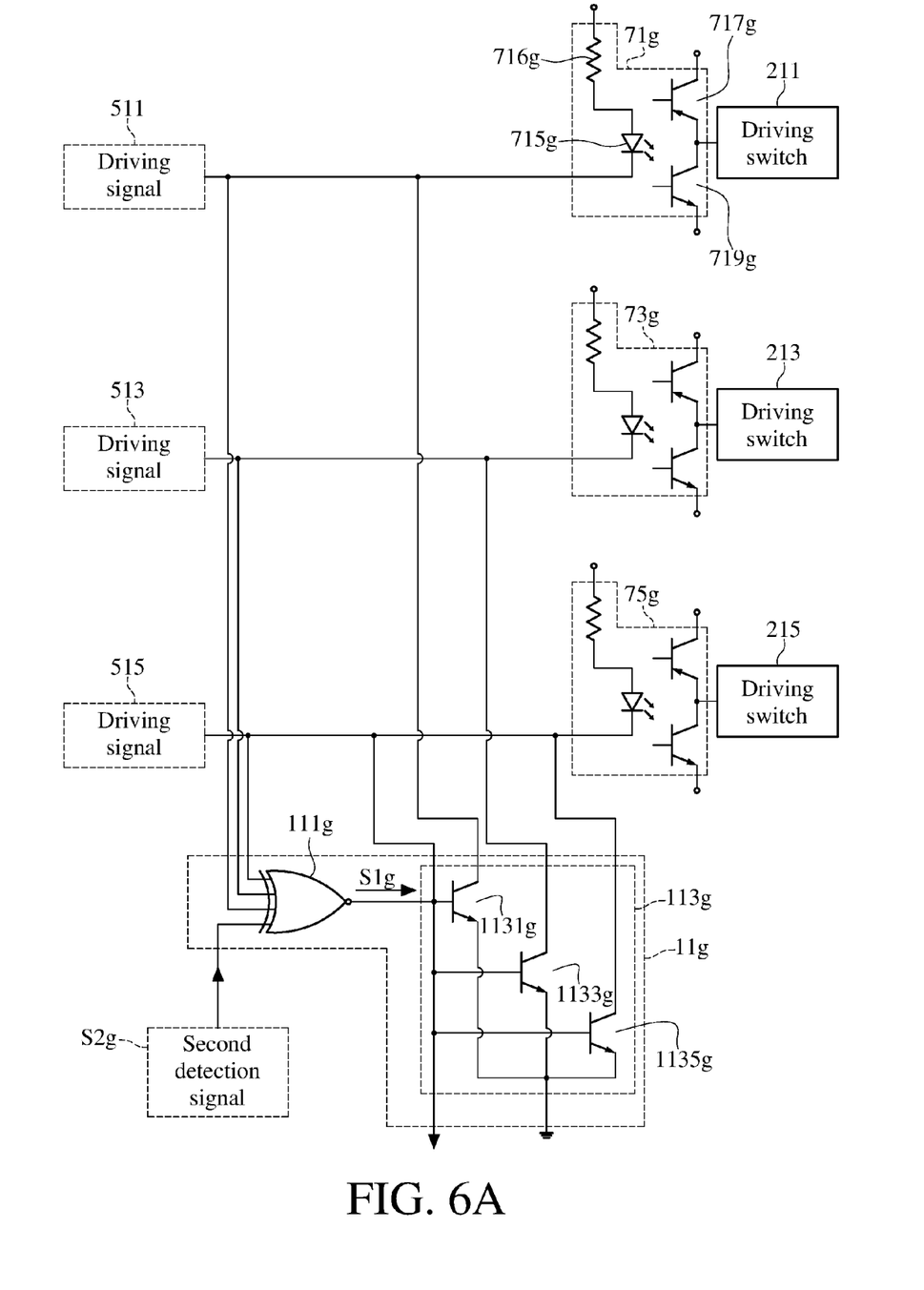
FIG. 6A is a schematic circuit diagram of a protection circuit in another embodiment.

Please refer to FIG. 6A. FIG. 6A is a schematic circuit diagram of a protection circuit in another embodiment. A sub protection circuit 11g has a structure similar to the embodiment shown in FIG. 5A. Each of the output stages 71g and 75g in FIG. 6A includes optical couplers 715g, 717g and 719g and a resistor 716g. The optical coupler 715g functions as an emitting terminal, and the optical couplers 717g and 719g function as receiving terminals. The optical coupler 715g is coupled to the driving signal 511 and is coupled to the high voltage potential through the resistor 716g. The optical couplers 717g and 719g are coupled to the driving switch 211. The optical coupler 715g outputs a light signal to the optical couplers 717g and 719g according to the driving signal 511 in order to selectively turn on the driving switch 211.

Figure 6B:
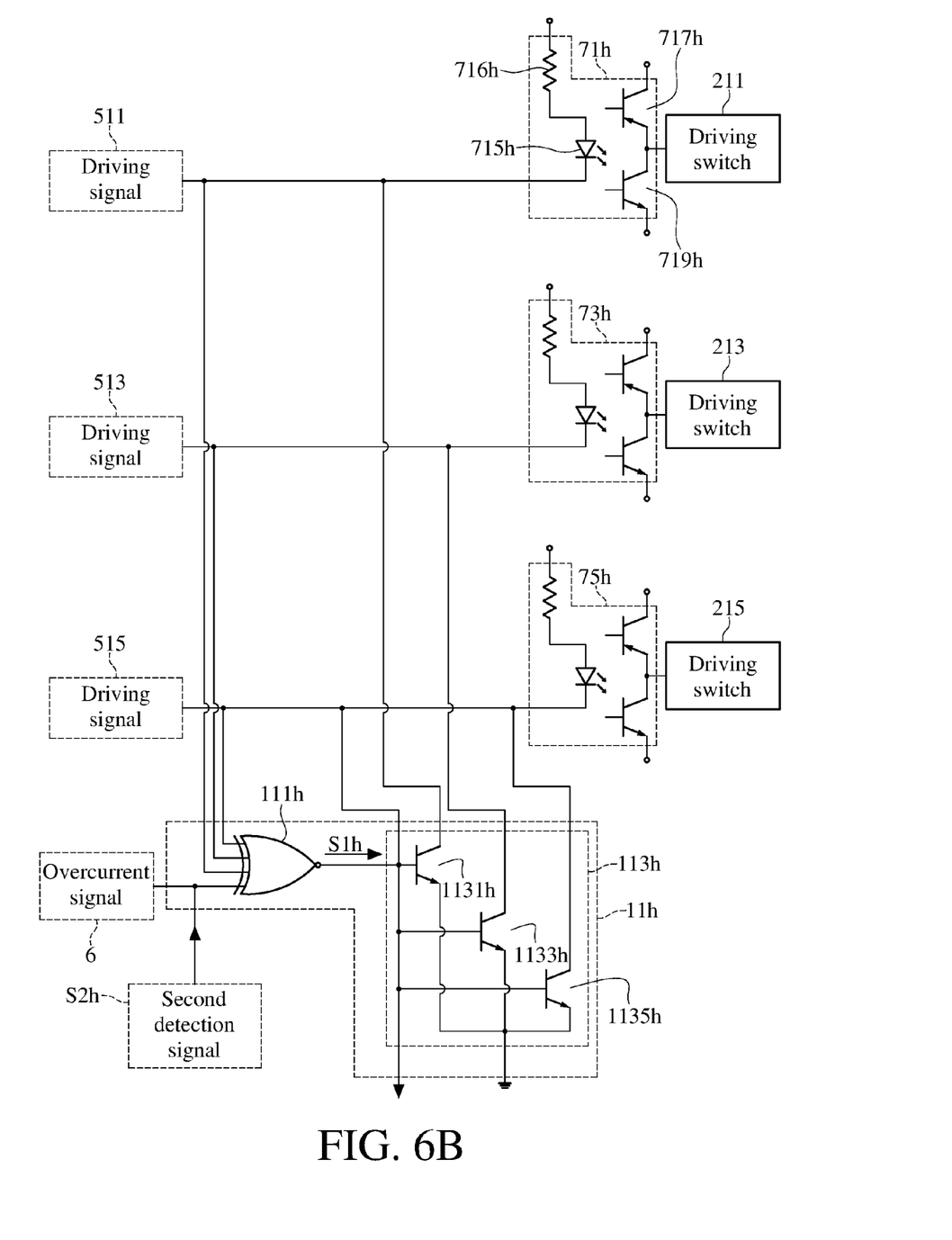
FIG. 6B is a schematic circuit diagram of a protection circuit in another embodiment.

Please refer to FIG. 6B. FIG. 6B is a schematic circuit diagram of a protection circuit in another embodiment. A protection circuit 1h includes the same structure of the output stage shown in FIG. 6A and selectively couples the driving signals 511 to 515 to the ground end according to the overcurrent detection signal 6. The details description of the protection circuit 1h can be referred to the aforementioned embodiments and thus, will not be repeated hereinafter.

In view of the embodiments of the protection circuit in the disclosure, when at least two driving signals in the same set of driving signals simultaneously indicate one or more current paths to be enabled between a power source and a load, a sub protection circuit in the protection circuit couples all driving signals in the set of driving signals to the ground end. Moreover, the protection circuit may have more sub protection circuits which can interlock each other. Therefore, when a set of driving signals indicating the occurrence of an error event is coupled to the ground end, other sets of driving signals are also coupled to the ground end in order to avoid accidental false actions in circuits. In addition, the sub protection circuits in the protection circuit may further interlock each other according to an overcurrent detection signal transmitted from the load in order to avoid the overload on the load. Also, the persons skilled in the art should understand that although the above embodiments are exemplified by a matrix convertor, the protection circuit in the disclosure can be applied to any conversion circuit or any control circuit, which has multiple phases and multiple arms. The disclosure may have a better practicability.

What is claimed is:

1. A protection circuit applied to a convertor comprising M pieces of driving switch modules that are coupled to a power source, a load and M sets of driving signals, wherein the ith driving switch module among the M pieces of driving switch modules is controlled by the ith set of driving signals in order to selectively enable a ith set of current paths between the power source and the load, and the protection circuit comprises:
   a first sub protection circuit comprising:
      a first protection switch module configured to selectively couple the ith set of driving signals to a reference voltage according to a first detection signal; and
      a first detection module coupled to the first protection switch module and configured to generate the first detection signal according to the ith set of driving signals when the ith set of driving signals indicate an error event;
   wherein M and i are positive integers, and i is not larger than M.

2. The protection circuit according to claim 1, wherein the first detection module comprises:
   an exclusive-OR gate configured to generate a first logic signal according to the ith set of driving signals; and
   a first logic gate configured to generate the first detection signal according to the first logic signal.

3. The protection circuit according to claim 2, wherein the first logic gate is a NOT gate.

4. The protection circuit according to claim 2, wherein the first detection module comprises a second logic gate configured to generate a second logic signal according to an overcurrent detection signal transmitted from the load, and the first logic gate further generates the first detection signal according to the second logic signal; and when the overcurrent detection signal indicates the occurrence of an overcurrent event, the first protection switch module couples the ith set of driving signals to the reference voltage according to the first detection signal.

5. The protection circuit according to claim 4, wherein the first logic gate is a NAND gate, and the second logic gate is a NOR gate.

6. The protection circuit according to claim 1, further comprises:
   a second sub protection circuit comprising:
      a second protection switch module configured to selectively couple the jth set of driving signals to the reference voltage according to a second detection signal; and
      a second detection module coupled to the jth protection switch module among the M pieces of driving switch modules and configured to generate the second detection signal according to the jth set of driving signals;
   wherein the first sub protection circuit is coupled to the second sub protection circuit, when the jth set of driving signals indicate the occurrence of the error event, the second sub protection circuit couples the jth set of driving signals to the reference voltage and the first sub protection circuit couples the ith set of driving signals to the reference voltage according to the second detection signal;
   j is a positive integer, is not larger than M, and is different from i.

7. The protection circuit according to claim 6, wherein the first detection module comprises:
   a first exclusive-OR gate configured to generate a first logic signal according to the ith set of driving signals;
   a first logic gate configured to generate the first detection signal according to the first logic signal and a second logic signal; and
   a second logic gate configured to generate the second logic signal according to the second detection signal; and
   the second detection module comprises:
      a second exclusive-OR gate configured to generate a third logic signal according to the jth set of driving signals;
      a third logic gate configured to generate the second detection signal according to the third logic signal and a fourth logic signal; and
      a fourth logic gate configured to generate the fourth logic signal according to the first detection signal.

8. The protection circuit according to claim 7, wherein the first logic gate is a NAND gate, the second logic gate is a NOT gate, the third logic gate is a NAND gate, and the fourth logic gate is a NOT gate.

9. The protection circuit according to claim 7, wherein second logic gate further generates the second logic signal according to an overcurrent detection signal transmitted from the load, and the fourth logic gate further generates the fourth logic signal according to an overcurrent event;
   wherein when the overcurrent detection signal indicates the occurrence of the overcurrent event, the first protection switch module couples the ith set of driving signals to the reference voltage according to the first detection signal and the second protection switch module couples the jth set of driving signals to the reference voltage according to the second detection signal.

10. The protection circuit according to claim 9, wherein the first logic gate is a NAND gate, the second logic gate is a NOR gate, the third logic gate is a NAND gate, and the fourth logic gate is a NOR gate.

11. The protection circuit according to claim 1, wherein the first detection module is a XNOR gate configured to generate the first detection signal according to the ith set of driving signals and a second detection signal.

12. The protection circuit according to claim 11, further comprising:

M pieces of output stages in which the ith output stage is coupled to the ith driving switch module and is controlled by the ith set of driving signals to drive the ith driving switch module to selectively enable the ith set of current paths.

13. The protection circuit according to claim 12, wherein when an overcurrent detection signal transmitted from the load indicates the occurrence of an overcurrent event, the first protection switch module couples the ith set of driving signals to the reference voltage according to the overcurrent detection signal.

14. The protection circuit according to claim 13, wherein the ith output stage comprises:
   a first transistor having a first terminal, a second terminal and a first control terminal, the first terminal coupled to the ith driving switch module, the second terminal coupled to a high voltage, and the first control terminal coupled to the ith set of driving signals; and
   a second transistor having a third terminal, a fourth terminal and a second control terminal, the third terminal coupled to the reference voltage, the fourth terminal coupled to the second terminal and the ith driving switch module, and the second control terminal coupled to the ith set of driving signals and the first control terminal.

15. The protection circuit according to claim 14, wherein the first transistor is a PNP bipolar junction transistor, and the second transistor is a NPN bipolar junction transistor.

16. The protection circuit according to claim 12, wherein the XNOR gate further generate the first detection signal according to an overcurrent detection signal transmitted from the load; and when the overcurrent detection signal indicates the occurrence of an overcurrent event, the first sub protection circuit couples the ith set of driving signals to the reference voltage according to the overcurrent detection signal.

17. The protection circuit according to claim 16, wherein the ith output stage comprises optical couplers each having an input terminal coupled to the ith set of driving signals, and an output terminal coupled to the ith driving switch module.

* * * * *